US007046651B2

(12) United States Patent  
Terry

(10) Patent No.: US 7,046,651 B2
(45) Date of Patent: May 16, 2006

(54) SYSTEM TOPOLOGIES FOR OPTIMUM CAPACITY TRANSMISSION OVER WIRELESS LOCAL AREA NETWORKS

(75) Inventor: John Terry, Garland, TX (US)

(73) Assignee: Nokia Corporation, Espoo (FI)

( * ) Notice: Subject to any disclaimer, the term of this patent is extended or adjusted under 35 U.S.C. 154(b) by 13 days.

(21) Appl. No.: 10/753,206

(22) Filed: Jan. 6, 2004

(65) Prior Publication Data

US 2004/0196871 A1 Oct. 7, 2004

Related U.S. Application Data

(60) Provisional application No. 60/460,553, filed on Apr. 4, 2003.

(51) Int. Cl.
*H04Q 7/24* (2006.01)

(52) U.S. Cl. ....................... 370/338

(58) Field of Classification Search ................ 370/338, 370/445, 446, 447, 449; 709/232; 455/101
See application file for complete search history.

(56) References Cited

U.S. PATENT DOCUMENTS

| | | | |
|---|---|---|---|
| 6,363,062 B1 | 3/2002 | Aaronson et al. | 370/348 |
| 6,393,032 B1 | 5/2002 | Ikegami | 370/447 |
| 6,430,172 B1 | 8/2002 | Usui et al. | 370/347 |
| 2002/0071448 A1 | 6/2002 | Cervello et al. | 370/445 |
| 2002/0071449 A1* | 6/2002 | Ho et al. | 370/447 |
| 2002/0163933 A1* | 11/2002 | Benveniste | 370/465 |
| 2003/0012165 A1 | 1/2003 | Soomro et al. | 370/338 |
| 2004/0151146 A1* | 8/2004 | Hammerschmidt | 370/338 |

FOREIGN PATENT DOCUMENTS

WO WO-02/41586 A2 5/2002

OTHER PUBLICATIONS

"Part 11: Wireless LAN Medium Access Control (MAC) and Physical Layer (PHY) specifications: Higher-Speed Physical Layer Extension in the 2.4 GHz Band"; IEEE Std 802.11b-1999 (Supplement to ANSI/IEEE Std. 802.11, 1999 Edition) 96 pages; Sep. 16, 1999.

(Continued)

*Primary Examiner*—Ricky Q. Ngo
*Assistant Examiner*—Derrick W. Ferris
(74) *Attorney, Agent, or Firm*—Harrington & Smith, LLP

(57) ABSTRACT

An inventive method provides optimum topology for a multi-antenna system dedicated to higher throughput/capacity by bundling the Point Coordination Function (PCF) operation in infrastructure mode of the current and/or enhanced IEEE MAC with PHY specifications that employ some form of coherent weighting based on CSI at the transmitter in conjunction with the corresponding optimum receiver detection based on CSI. Specifically, CSI is measured from a control message, so data messages and control messages are separated. In the contention period of IEEE 802.11, the RTS/CTS exchange is used for CSI and the data message is sent following the CTS message. In the contention free period, a poll by the PC is separated from a data frame, which gives the polled station the first opportunity to send a data message. This change in topology results in various changes to the frame exchange format in the CFP for various scenarios of data and control messages to be exchanged.

19 Claims, 9 Drawing Sheets

OTHER PUBLICATIONS

"Part 11: Wireless LAN Medium Access Control (MAC) and Physical Layer (PHY) specifications: High-Speed Physical Layer in the 5 GHz Band"; IEEE Std 802.11a-1999 (Supplement to IEEE Std. 802.11-1999) 91 pages; Sep. 16, 1999.

"Part 11: Wireless LAN Medium Access Control (MAC) and Physical Layer (PHY) specifications: Amendment 4: Further Higher Data Rate Extension in the 2.4 GHz Band"; IEEE Std 802.11g™-2003 (Amendment to IEEE Std. 802.11™, 1999 Edition (Reaff 2003) as amended by IEEE Stds 802.11a™-1999, 802.11b™-1999, 802.11™-1999/Cor 1-2001, and 802.11d™-2001) 77 pages; Jun. 27, 2003.

"Part 11: Wireless LAN Medium Access Control (MAC) and Physical Layer (PHY) specifications: Medium Access Control (MAC) Enhancements for Quality of Service (QoS)"; IEEE Std 802.11e/D5.0, Jul. 2003 (Draft Supplement to IEEE Std. 802.11, 1999 Edition (Reaff 2003)) 165 pages; Jul. 2003.

* cited by examiner

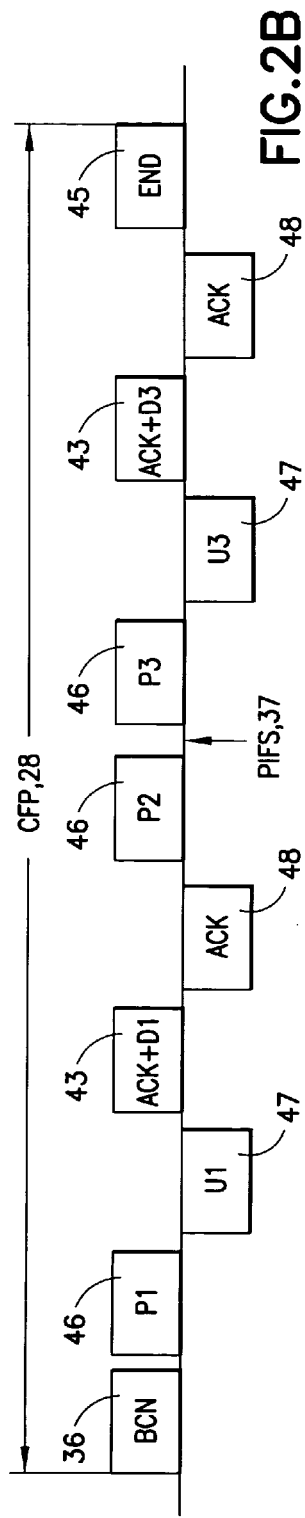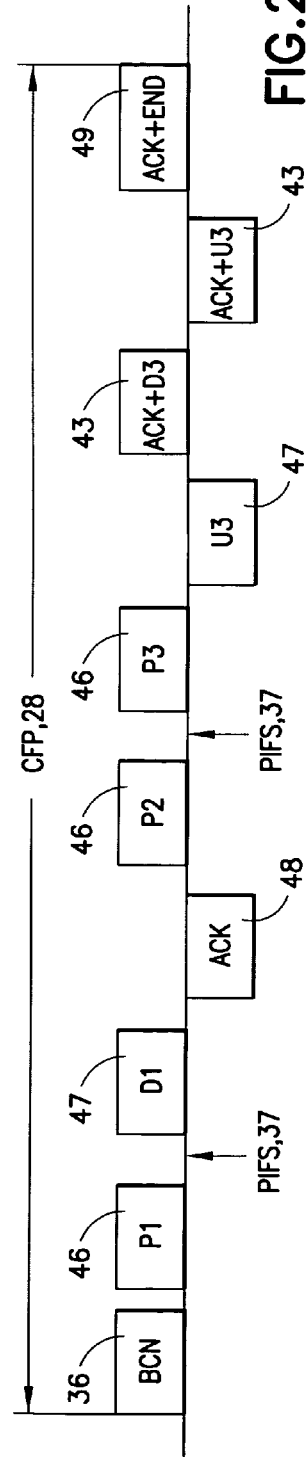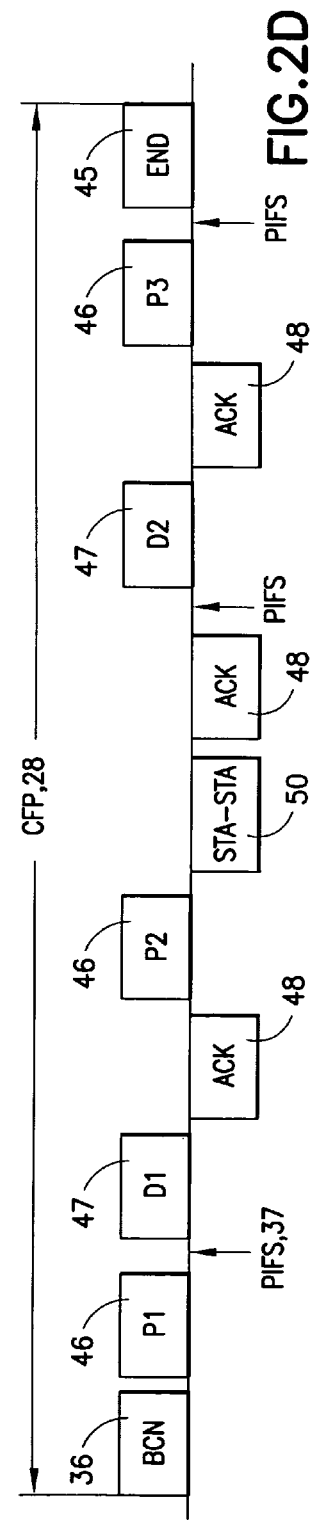

SYSTEM TOPOLOGIES FOR OPTIMUM CAPACITY TRANSMISSION OVER WIRELESS LOCAL AREA NETWORKS

PRIORITY STATEMENT

The present invention claims priority from Provisional U.S. Patent Application No. 60/460,553, filed with the U.S. Patent Office on Apr. 4, 2003.

FIELD OF THE INVENTION

The present invention relates broadly to Wireless Local Area Networks (WLANs) and specifically to a topology for multi-channel wireless time division duplex (TDD) systems so that channel state information (CSI) may be acquired and used to optimize data throughput.

BACKGROUND

Highly functional computers have been interconnected with one another in what is termed a local area network (LAN) to enable users of individual computers within a predefined set to share files with one another. Traditional hardwired LANs are being superceded by wireless LANs (WLANs) as WLANs realize increased capacity. Data protocols for WLANs are generally organized into layers or levels of the communication system, each layer facilitating interoperability between various entities within the network.

The Institute of Electrical and Electronic Engineers (IEEE) standard for WLANs, IEEE 802.11, provides protocols for a physical (PHY) layer and a Medium Access Control (MAC) layer, shown in block diagram form at FIG. 1A. The following discussion relates to that 802.11 standard in its current form, though it is evolving. The PHY layer 21 provides protocol for the hardware of WLANs termed stations or nodes. A station may be mobile station, wireless enabled laptop or desktop personal computer, and the like. The PHY layer concerns transmission of data between those stations, and there are currently four different types of PHY layers: direct sequence spread spectrum (DSSS) 22, frequency-hopping spread spectrum (FHSS) 23, infrared (IR) pulse modulation 24, and orthogonal frequency-division multiplexing (OFDM).

The MAC layer 25 is a set of protocols that maintain order in the use of the shared bandwidth or medium, and the 802.11 standard specifies two modes of communication: a compulsory Distributed Coordination Function (DCF) 26, and an optional Point Coordination Function (PCF) 27. A Basic Service Set (BSS) 31 is shown in FIG. 1B, and is defined as a group of stations 32 that are under the control of a single coordination function, which in 802.11 is termed a Point Coordinator PC that may also be an Access Point (AP) 33. A BSS is roughly analogous to a group of mobile telephone users within a cell of a single base station, with the base station as the AP 33. Conceptually, every station in a BSS can communicate with every other station in that BSS, though degradations to the transmission medium due to multipath fading or interference from nearby BSSs can result in 'hidden' stations. The 802.11 standard provides for two types of networks: ad hoc and infrastructure. Individual stations in the ad-hoc network are deliberately grouped as a BSS, but any station in the BSS may communicate directly with any other station in the BSS without channeling all traffic through the centralized Access Point (AP). A good example of an ad hoc network is a meeting where employees bring laptop computers together to communicate and share files. One of the stations serve as a Point Coordinator to coordinate transmissions and avoid collisions, but the PC in an ad hoc network does not act as an AP 33 that may link the BSS 31 to other BSSs or networks. Conversely, the infrastructure network uses one or more fixed network APs 33 by which wireless stations can communicate beyond the BSS 31. These network APs are sometime used to bridge the BSS to other BSSs to form an extended service set (ESS) and/or to wired networks such as the internet or a conventional intranet as shown in FIG. 2A. If AP service areas overlap, handoffs can occur for roaming stations that move between APs similar to cellular networks commonly used for mobile telephony. In the MAC layer, the DCF operates in both ad hoc networks and infrastructure networks. However, since PCF requires an AP 33, PCF may operate only in infrastructure networks.

Avoiding collisions (simultaneous transmissions) between stations in a BSS is complicated by the fact that while a wireless station is transmitting, it cannot monitor the transmission medium (the channel or channels) for other traffic that may interfere with its own transmissions. For example, one problem arising from the inability to listen while transmitting in WLANs is termed a "hidden node". Assume stations A, B and C in a BSS are disposed as in FIG. 1B, with B physically located between A and C. If stations A and C cannot communicate directly with one another due to distance, multipath fading, or some other reason, stations A and C are hidden from one another. Absent some collision control scheme, station A may listen to the channel, sense it is clear, and transmit a packet to station B. Whether or not station C is transmitting to B is unknown to A, except through coordination by the PC. Simultaneous transmissions from stations A and C to station B would result in collision and lost transmissions, since all stations in a BSS 31 communicate over the same channel.

DCF seeks to minimize collisions by prioritizing stations waiting to transmit based on a time delay basis. In DCF, each station 32 with a data message to transmit contends for the next available slot on the BSS channel during what is termed a contention period CP 29. Time delays for various stations have a random component, but procedures ensure a waiting station moves up in priority the longer it waits. Details of the DCF prioritization protocol are described in detail below. Once a station sends its data message, which is included in a MAC Service Data Unit (MDSU), it must contend with all other waiting stations for another available slot. PCF is provided to avoid the situation where time-sensitive data from one station cannot be assembled into one MDSU, which is constrained to a maximum length. For example, station A may wish to send an audio or video clip that spans three MDSU's to station B, but contending for a separate transmission slot for each of the MDSUs would potentially result in the clip being undecipherable. While a relatively large buffer in the receiving station may store and re-assemble the separately received clip portions after a not insignificant delay, that option is generally not seen as viable in the long term due to the dual constraints of low power consumption and small physical size of wireless stations. When implemented, PCF takes priority over DCF in that a contention free period (CFP) 28 is established whereby station A may send its data messages without contending for a time slot. During the CFP 28, other stations stand by and await either a poll by the PC during the CFP 28 or a contention period (CP) 29 in which the various stations contend for a slot as in DCF above. Additional details of PCF are provided below.

Historically, the development of WLAN systems, and wireless systems in general, have taken two paths, one focused on specifications for the PHY layer and the other for the MAC layer. For example, the IEEE 802.11(e) task group is developing MAC layer enhancement to improve MAC layer throughput regardless of physical layer throughput. The IEEE 802.11(g) task group has developed a physical layer specification that facilitate data rates of 20+ mega bits per second (Mbps) in the 2.4 GHz. Range, but must keep MAC layer changes to a minimal. Though both working groups operate concurrently, in practice there appears little interaction between the two groups. Advantages that may be gained by a more holistic approach are never recognized by the groups' single-layer focus.

Recently, the IEEE has approved a High Throughput Study Group (HTSG) for 802.11, whose charter is to provide higher throughput than enabled by current IEEE 802.11 standards. The High Throughout Task Group (HTTG) will develop the actual standards, which appears to be the first time that modifications to the MAC and physical layers will be developed coherently since the division of those layers. A recent study showed that the current IEEE MAC and physical layers is limited to a throughput of 0.2 Mbps per 1000 byte packet per operational mode. Existing 54 Mbps modes therefore have approximately 28 Mbps throughput for a 1000 byte packet. Maintaining the same ratios, then a 108 Mbps data rate yields a throughput of 56 Mbps for a 1000 byte packet.

It is well-known that optimum capacity is achieved when Channel State Information (CSI) is known and used at both the transmitter and receiver, and that MIMO systems (multiple input/receive antennas and/or multiple output/transmit antennas) provide a substantial increase in capacity as compared to more traditional systems employing a single antenna on all transceivers. For example, knowing CSI enables a transmitter to parse data among different channels in a manner that takes advantage of the entire channel capacity on each channel, rather than allowing the time-sensitive bandwidth to be not fully used. Some communication standards such as Code Division Multiple Access (CDMA) reserve a feedback channel to provide CSI to the transmitter. Unfortunately, CSI via a feedback channel is imperfect due to feedback delays and changing channel characteristics. Regardless, the 802.11 standard does not entail a feedback channel, there are no physical layer specifications in 802.11 that are based on CSI, and some researchers believe the lack of CSI in the standard prohibits the adoption of a feedback channel in future versions of 802.11.

Thus, there is a need in the art to provide an optimum throughput/capacity topology for multi-antenna wireless systems that imposes changes that are backwards compatible with current WLAN stations.

SUMMARY OF THE INVENTION

Fortunately, there are resolutions to this problem that are embodied in the present invention. As mention above, there are no physical layer specifications in the IEEE 802.11 standard that are based on CSI at the transmitter. Operation of the Contention Free Period (CFP) is described in the IEEE 802.11(e) draft standard, herein incorporated by reference. Depending on the physical layer standard 802.11(a), 802.11 (b) or 802.11(g), the CFP modulation is derived from one of their operational modes.

A system according to an embodiment of this invention provide the optimum topology for a multi-antenna system dedicated to higher throughput/capacity by bundling the Point Coordination Function (PCF) operation in infrastructure mode of the current and/or enhanced IEEE MAC with PHY specifications that employ some form of coherent weighting based on CSI at the transmitter in conjunction with the corresponding optimum receiver detection based on CSI.

In one embodiment of the present invention is a method of communicating over multiple sub-channels of a WLAN. The method includes sending a control message that is not combined with a data message from a first network entity to a second network entity. The control message may be, for example, a CTS message during the CP or a poll during the CFP, but in any case the control message is to facilitate sequencing of wireless transmissions among at least two entities in a wireless network. In the inventive method, the control message is received at the second network entity, which uses it to obtain channel state information CSI. The CSI is used to determine the capacities of at least a first and second sub-channel of the wireless network, and to determine which has the greater capacity. A data message to be sent is divided into at least a first and second data message segment, wherein the relative sizes of the segments are based on the relative capacities of the sub-channels. The division itself is preferably via an eigenmode or water-filling known in the art to exploit varying capacities of sub-channels. When the first sub-channel is determined to have the greater capacity, the first data message segment will then define a greater size than the second data message segment. Further in the method and in response to receiving the control message, the second network entity sends the first data message segment over the first sub-channel, and the second data message segment over the second sub-channel of the wireless network. In this manner, CSI is obtained and used to send the segmented data message, though not necessarily the control messages.

In a particular embodiment, the first network entity is a point coordinator PC of a wireless network basic service set BSS operating during a contention free period CFP, the control message is a poll of the second network entity, and the PC may respond with an ACK message combined with a data message for the first network entity. Preferably, where the PC sends a poll of a third network entity during the same CFP as the poll of the second network entity, and the PC fails to receive a response from the third network entity within a first time period such as a SIFS, the PC then polls a fourth network entity within a second time period such as a PIFS that is no greater than twice the first time period. Where the PC receives from a network entity an ACK message combined with a data message, the PC may respond with an ACK message combined with a separate control message that signals an end of a contention free period. In the 802.11 standard, for example, such a message from the PC would be a combined ACK and CFP-End message.

Further according to another aspect of the present invention, when the method is executed during a contention free period CFP, and the first network entity is a point coordinator PC and the control message is a first poll of the second network entity, there exists an instance where a polled station does not respond to its poll. To avoid confusion with the terms above, assume an initial poll of an initial network entity or station occurs prior to the poll of the second network entity or station. Prior to sending a control message without a data portion from the PC to the second network entity, the method preferably also includes sending from the PC an initial poll without a data message to an initial network entity. Upon the PC failing to receive a response to the initial poll from the initial network entity within a first time period such as a SIFS, the PC then preferably sends, within a second time period such as a PIFS that is greater than the first time period, either a data message to the initial network entity or the first poll of the second network entity as described above.

The present invention may also be adapted for station-to-station data communications during the CFP. Where the method as summarized above is executed during a CFP, the data message in its various segments is sent over the sub-channels from the second network entity to a third network entity that is not a point controller PC. In that instance, the method further includes the third network entity sending to the second network entity an ACK message within a first time period, in response to receiving the data message segments. The PC may then send, within a period of time following the ACK message from the third entity that is less than twice the first time period, either a poll to a network entity, or a data message to the second network entity that is divided into data message segments based on CSI that is measured from at least one data message segment sent from the second network entity to the third network entity. If the PC is to allow the second and third stations to exchange multiple data messages between them, the PC will wait a PIFS before transmitting. If the PC is to allow only one cohesive data message from the second to the third entity, it need wait only one SIFS after the ACK message from the third to the second entity, or one PIFS following the data message from the second to the third entity.

In the above method, at least one of the network entities is preferably a mobile station such as a mobile phone. The term mobile station as used herein includes any portable electronic device that has a telephonic capability, such as cellular phones, portable communicators, PDAs with telephonic capability, and further includes the various accessories to the above that expand the capabilities or functionality of the mobile station with which they are coupled.

According to another embodiment of the present invention is a method of communicating data over a wireless network according to an IEEE 802.11 standard as it exists as of the priority date of this application. In this embodiment, the improvement to the 802.11 standard includes separating by at least one Short InterFrame Space SIFS a poll and a data message sent by a point controller PC while in a contention free period CFP. This allows data messages sent from the PC to be transmitted with the benefit of knowing CSI, with at least one possible exception noted below.

Preferably, CSI is also obtained during the contention period CP during a Request-to-Send/Clear-to-Send RTS/CTS exchange. In that instance, CSI is used to determine relative capacities of at least a first and second sub-channel to parse a data message from a station sending the RTS to a station sending the CTS. Specifically, a data message from the RTS-sending station is parsed into at least a first data message segment defining a first size and a second data message segment defining a smaller second size. The relative segment sizes are based on relative capacities of a first and second sub-channel as determined by the measured CSI. The larger first data message segment is sent over the higher capacity first sub-channel and the smaller second data message segment is sent over the lower capacity second sub-channel. Parsing of the overall data message is based on relative sub-channel capacity as determined by the measured CSI, such as by eigenmode or water-filling techniques known in the art.

Considering again the CFP, this embodiment of the present invention preferably restricts the PC to sending only one of five possible messages: a poll; a data message parsed according to measured CSI and transmitted among at least two sub-channels; a data message so parsed and transmitted combined with an ACK message; a CFP-End message; and a CFP-End message combined with an ACK message. Conversely, 802.11 currently allows a data message to be combined with a poll message, and does not provide that an ACK can be combined with a CFP-End message since there appears no opportunity for the latter to ever need be combined as the standard currently exists. Preferably, the PC can combine a data message only with an ACK message, else the data message may not be combined with any other message.

Preferably, the PC is allowed to send a data message without valid measured CSI to a station only upon non-receipt of a response from that same network entity to its poll within one SIFS. Most preferably, the PC can only send a data message with either valid measured CSI or estimated CSI.

Where the PC and the polled station each have a data message to send, one difference of the present invention as compared to the 802.11 standard is that the polled station is preferably allowed to send its data message first. Preferably, between the time the PC polls the station and the time the PC may next transmit, the polled station may send a data message to another station (that is not the PC) without using measured valid CSI for the channel between the polled station and the another station. In this instance, the another station is allowed an opportunity (one SIFS) to send an ACK message to the polled station prior to the time the PC is next allowed to transmit.

Another aspect of the present invention is a network entity for communicating over a wireless local area network, such as a mobile station, a point controller, an access point, or any other entity on the WLAN. The network entity includes a receiver for receiving over at least two sub-channels a control message from an entity of a wireless local area network. The control message is preferably a CTS message or a poll. The mobile station further has a processor for determining a capacity of a first sub-channel and a capacity of a second sub-channel based on channel state information CSI measured from the control message. It further includes means for parsing a data message into at least first and second segments based on the relative determined capacities of the first and second sub-channels. To best exploit the multi-channel capability in both transmit and receive functions, the mobile station has a first and second antenna having inputs coupled to an output of the means for parsing. The first antenna is for transmitting at least the first segment over the first sub-channel and the second antenna for transmitting at least the second segment over the second sub-channel. In certain embodiments, there may be a crossfeed between antennas with differential weighting for each data message segment so that each segment is actually transmitted over each sub-channel, and increased capacity is realized by the differential weights assigned to each segment.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is better understood in light of the following drawings.

FIG. 2B is similar to FIG. 2A but reflecting changes according to the present invention.

FIG. 2C is similar to FIG. 2B but showing a different exchange of data packets.

FIG. 2D is similar to FIG. 2B but showing yet another different exchange of data packets.

DETAILED DESCRIPTION

Figure 1A:
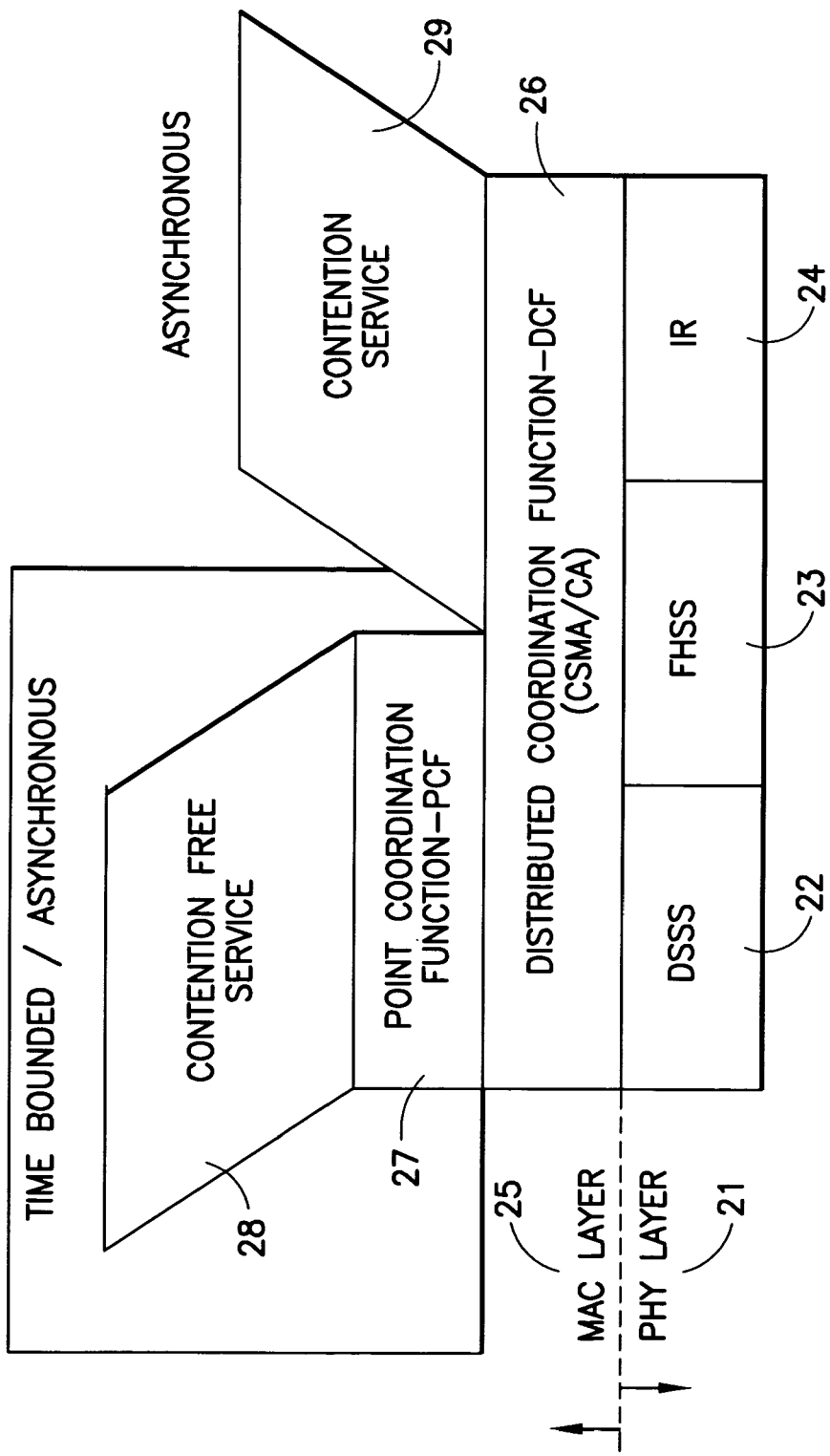
FIG. 1A is a prior art block diagram showing MAC and PHY layer structures in 802.11.
Figure 1B:
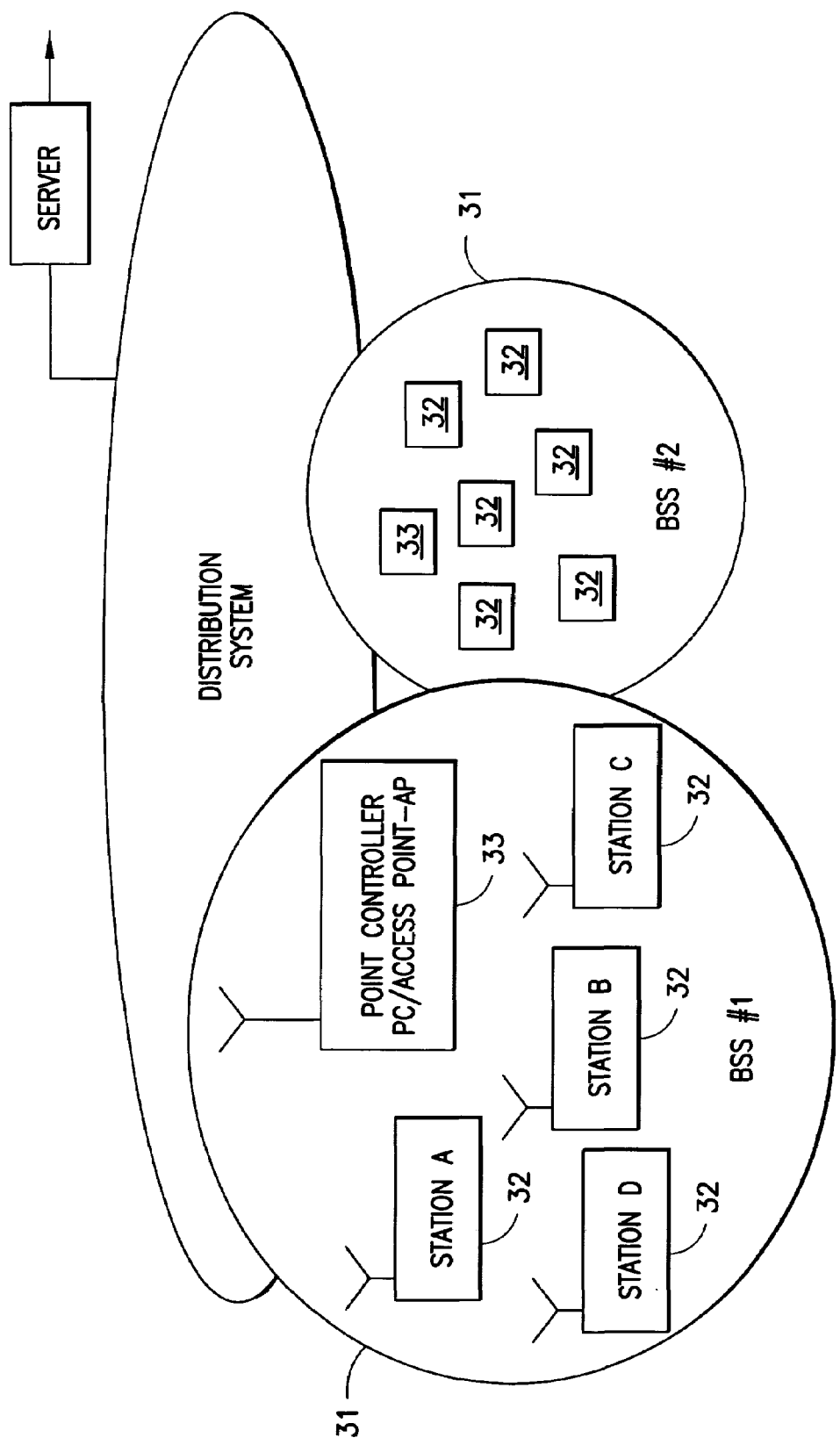
FIG. 1B is a prior art block diagram showing BSS's connected to a wired network by a Distributions System.
Figure 2A:
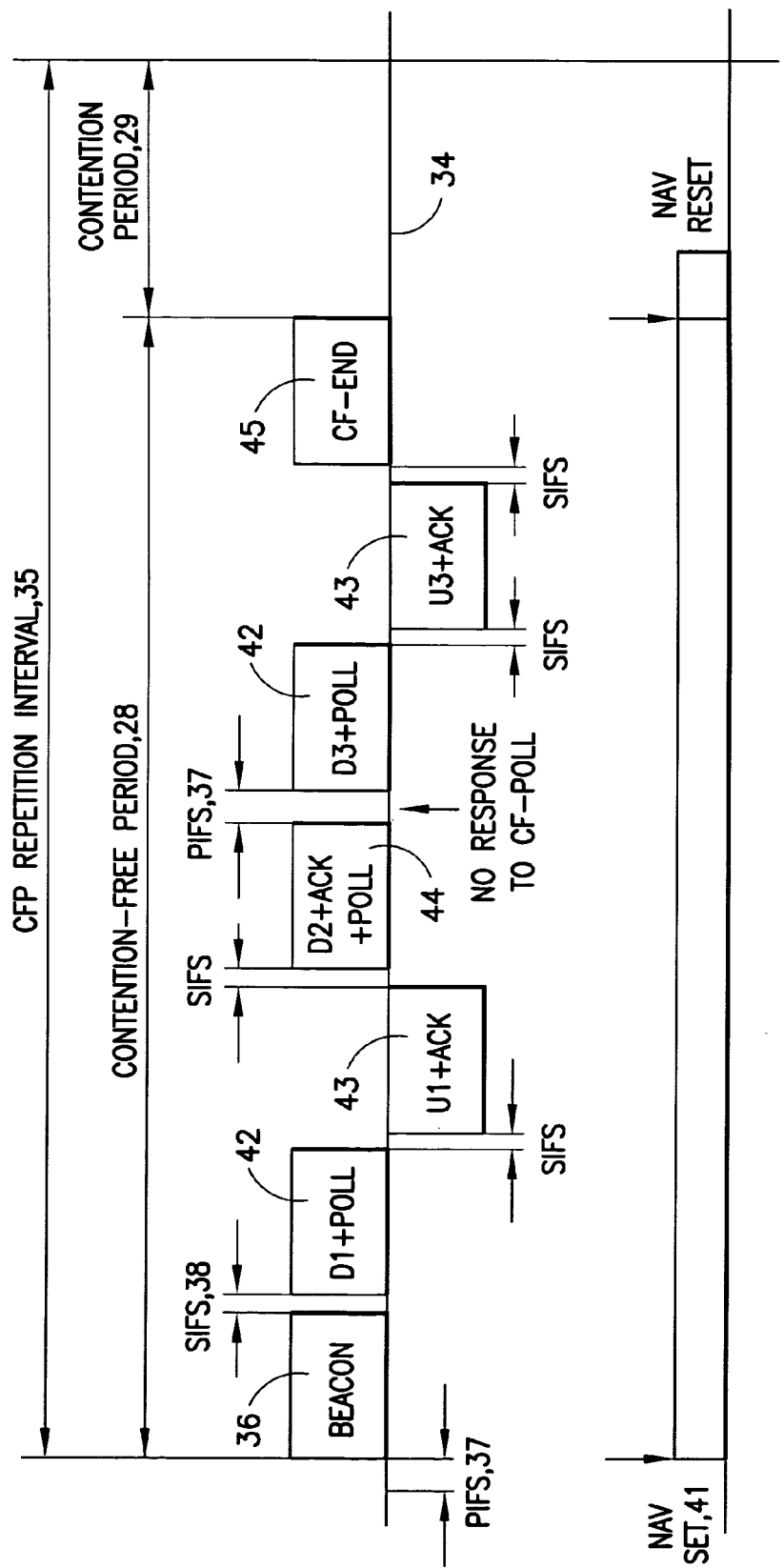
FIG. 2A is a prior art timing diagram showing a CFP overlain on a regular system implementing pure DCF.

In the 802.11 standard, a Point Controller (PC) coordinates prioritization during the contention free period CFP 28. The PC is functionally within the Access Point (AP) 33 of a BSS 31 and is usually physically collocated with it, so the term AP 33 is used herein to indicate either or both the AP 33 and PC. A station 32 may serve as the AP 33 and the CP. FIG. 2A is a prior art timing diagram showing transmissions sent (above the line designated 34) and received (below the line 34) by the PC according to the 802.11 standard. The time period illustrated in divided into the contention free period 28 and the contention period 29, which together comprise a CFP Repetition interval 35 sometimes referred to as a superframe. The CFP repetition intervals 35 continue so that, when PCF 27 is in use, the CFPs 28 and CPs 29 alternate. The CFP is described with reference to FIG. 2A, and the CP is described below in conjunction with the distributed coordination function DCF 26. Prioritization of transmissions by the various stations 32 in a BSS 31 is therefore via PCF 27 during a contention free period 28, and via DCF 26 during the contention periods 29.

A superframe 35 begins with a beacon frame 36 transmitted by the PC, regardless of whether PCF is active or not. The beacon frame 36 is a management frame that provides timing and protocol related parameters to the stations. Each beacon frame 36 also announces when the next beacon frame will be transmitted, so that all stations 32 are aware of superframe lengths. To enable PCF 27 to take priority over DCF 26, the PC transmits the beacon frame 36 after a PCF Interframe Space (PIFS) 37 (about 25 µs) following the end of the last superframe 35. Because the PIFS 37 is shorter than a DCF Interframe Space (DIFS, about 34 µs) that the DCF 26 must wait following the end of a superframe 35, PCF 27 can take priority. A Short Interframe Spacing (SIFS) 38 spans about 16 µs and is the amount of time a station 32 is allowed to reply to the PC. Each station 32 within the BSS 31 resets a Network Allocation Vector (NAV) 41 based on the beacon frame 36. In FIG. 2A, the NAV 41 informs the station 32 to set the beginning of the next CP 29 at the maximum span, and not to transmit during the intervening CFP 28 except under two circumstances: in response to being polled by the PC, or to send an ACK message within one SIFS after receiving a data message.

After the beacon frame 36, the PC delays one SIFS 38 and may send any of the following: a data-only frame, a data+poll frame 42, a poll-only frame, or a CFP-end frame. The PC maintains a list of stations for which it has data, and typically polls those stations first in order to piggyback that data with its poll of the station. Referring to FIG. 2A, the PC polls a first station and piggybacks data with that poll in a data+polling frame 42 (both data and poll are directed to the first station). Upon receiving the data, the first station responds with an acknowledgement (ACK), but itself piggybacks data (U1) on its ACK in a data+ACK frame 43. The first station is allowed a SIFS 38 to respond to the AP's poll, but may send its data (U1) to any station or to the PC. [If it is sent to a station other than the PC, that station has one SIFS to send its ACK, without piggybacking data, back to the first station.]

After receiving the data+ACK frame 43 from the first station (U1+ACK), the PC waits one SIFS and polls another station (or the same station). In the event the previous first station sent its data (U1) to the PC, the PC will piggyback an ACK for that first station in the data+poll it sends to a second station in a data+poll+ACK frame 44 (D2+ACK+Poll, data and poll directed to the second station, ACK directed to first station). In FIG. 2A, the second station does not respond within one SIFS, so after waiting a total of one PIFS, the PC sends a poll with data (D3) to a third station in another data+poll frame 42 (D3+Poll, data and poll to third station). The third station responds within a SIFS with data (U3) and an ACK in its data+ACK frame 43. When the PC has no more stations to poll, or when the CFP as determined by the beacon frame 36 nears its end, the PC transmits a CFP-End frame 45 to signal all stations 32 that the CFP 28 is ended.

One drawback with the prior art, at least in certain circumstances, is that the polling frames and the data frames from the PC may be combined into a single frame (data+poll 42 or data+ACK+poll 44). At the time of that combined frame transmission, the PC does not know the channel state between it and the intended station. While channel state may not change significantly over a single CFP repetition interval 35 when used in a wired network, channel states change much more rapidly in WLANs. To increase capacity over a fixed bandwidth, multiple sub-channels are preferably used such as in a single input/multiple output (SIMO) communication system, a multiple input/single output (MISO) system, or most preferably a multiple input/multiple output (MIMO) system. Any of these are referred to hereafter as a MIMO system unless otherwise stipulated. The multiple sub-channels of a wireless MIMO system are each subject to rapid changes due to fading, multipath, etc., so wireless MIMO systems need to know the state of the different sub-channels to send different data portions over the strongest channels, or to partition the data to be sent into sizes that maximize the respective capacities of the various sub-channels as those sub-channels exist at the time of transmission. When the PC polls a station, it has not yet received any feedback from that station by which to measure the true channel. Since the sub-channels change rapidly, it is highly unlikely that the coherence interval (the interval over which the measured state of the channel does not change significantly) spans an entire CFP repetition interval 35. Said another way, any measurements of the channel made in one CFP 28 are unlikely to be valid estimates of the channel during the next CFP 28. Sending a data message combined with a poll necessarily implies sending the data either regardless of channel quality or with invalid (i.e., outside the coherence interval) estimates of the channel. Either option is a waste of bandwidth as compared to maximum capacity theory. Among other aspects, the present invention modifies the specific frame exchange of FIG. 2A to enable entities transmitting data frames to do so with knowledge of the channel, termed in the art as channel state information or CSI.

FIG. 2B is similar to FIG. 2A but shows the same substantive exchange of data frames depicted in FIG. 2A (one data frame from the AP to each of a first, second, and third station, and one data frame from the first and third stations to the AP) accomplished according to the present invention. For each of FIGS. 2B–2D, only the CFP 28 is shown and the interval between frames is one SIFS unless otherwise noted. At the start of the CFP 28, the PC transmits a beacon frame 36 as described. The PC next transmits a polling-only frame 46 (P1) that is directed to the first station. The first station has a data frame for the PC, and has the opportunity to measure actual CSI between it and the PC in the polling frame 46. The first station uses that CSI to send a data only frame 47 back to the PC within one SIFS of the end of the polling frame 46. The PC receives the data only frame 47 (designated U1) and uses it to measure the channel between it and the first station. Using that CSI, the PC then sends its data for the first station combined with an acknowledgement that it (the PC) received the data frame from the first station in a data+ACK frame 43. This obligates the first station to reply with an ACK only frame 48 that it received the data correctly. After a SIFS, the PC then polls the second station (P2) in a polling-only frame 46. The second station does not respond within a SIFS, so after a total delay of one PIFS, the PC polls a third station. The exchange between the PC and the third station is similar to that described between the PC and the first station for FIG. 2B.

On first glance, it appears the exchange of frames of FIG. 2B introduces an inefficiency as compared to that of FIG. 2A, due to an increased number of frames and interframe spacings. However, the poll only 46 and ACK only 48 frames are quite short, whereas any frame that includes data 42, 43, 44, 47 may be substantially longer. In the present invention as embodied in FIG. 2B, the poll only frames 46 may be sent without valid CSI and all frames that include data are transmitted to maximize the available capacity of the channel. Preferably, all frames carrying data are sent with valid CSI by use of the present invention, though FIG. 2C notes an exception. While additional MAC overhead may be increased as compared to the method of 802.11, throughput is increased due to the larger size of frames with data as compared to those without. Various frame sizes and throughputs are detailed below with reference to FIGS. 5–10.

FIG. 2C is an illustration of frame exchange for the instance where the AP has data for the first and third station, and only the third station has data for the PC. The beacon 36 and polling only 46 (P1) frames are as described with reference to FIG. 2B. Since the first station of FIG. 2C has no data for the PC, it does not respond to the poll within a SIFS and the PC is allowed to transmit again after a PIFS 37. In one embodiment of the invention, the PC sends a data-only frame 27 (D1) to the first station without having had an opportunity to measure CSI (since the first station did not respond to the poll within a SIFS). The first station sends an ACK only frame 48, and the remainder of FIG. 2C is similar to FIG. 2B except the portion beginning with the frame designated ACK+U3. Rather than sending an ACK only frame 48 as in FIG. 2B, the third station has data for the PC, which it sends with an ACKnowledgement in a data+ACK frame 43. Assuming there are no further stations for the PC to poll, it responds to this last transmission from the third station with an ACK+end frame 49, wherein the ACK is directed to the third station and the CF-END portion is directed to all stations 32 of the BSS 31.

As an alternative to the scenario described for FIG. 2C wherein the PC sends a data only frame 47 to the first station without benefit of CSI, the first station (or any station being polled but not having data to transmit to the PC) may be obliged to reply with an ACK only frame 48 in order that the PC may measure the channel. Since the PC may also not have data for the station responding to a poll with an ACK only frame 48, there is a potential to waste bandwidth that in the cumulative becomes non-negligible. This wasting aspect may be minimized by including within the poll frame information that indicates whether or not the PC has data to send to the polled station, which may be as little as a single bit (e.g., 0 indicates no data, 1 indicates data). The polled station may disregard that information if it has data to send to the PC (as in FIG. 2B), allow a SIFS to expire without responding if the information indicates there is data (as in the exchange depicted in FIG. 2C between the PC and the first station), or respond with an ACK only frame 48 if the information indicates there is data coming from the PC (as in the exchange depicted in FIG. 2D between the PC and the second station).

FIG. 2D depicts frame exchange for additional scenarios. The beacon 36 and exchange between the PC and the first station are as in FIG. 2C. Upon polling a second station with a polling only frame 46 (P2), the second station responds with a data frame to another station 51 rather than to the PC. This station-to-station data frame 51 is sent without the benefit of valid measured CSI, since there is no prior communication, within the coherence interval, from the recipient of the station-to-station data frame 51 by which to measure the channel. The recipient station then responds with an ACK only frame 48 directed back to the sending station. Though the data in frame 51 was directed toward another station, the PC still listens and uses it to measure the channel between it and the second station. Following the ACK only frame 48 directed back to the second station, the PC may send a data only frame 47 to the second station without drawing a direct response from it. The PC may wait a PIFS, to allow the second station an opportunity to send additional station-to-station data frames 51. The second station sends an ACK only frame 48 back to the PC, which then polls a third station with a polling only frame 46. The third station in the scenario of FIG. 2D has no data to transmit, so the PC waits a PIFS 37 and transmits a CF-END frame 45 to transition into the contention period 29.

In any of the above instances, any of the PC or stations may have more than one frame with data to send. Due to the potential size of the data frames and the speed with which the channel may vary over time (the length of the coherence interval), it may be necessary in one instance that the sender re-acquire CSI from the last transmission of the intended recipient, and in another instance it may have negligible effect on data throughput that the sender re-use the originally measured CSI. So long as the frames in question are sent within the coherence interval established when CSI is measured, then CSI is considered valid whether or not is was measured based on a frame received immediately preceding the next frame to be sent.

Figure 3:
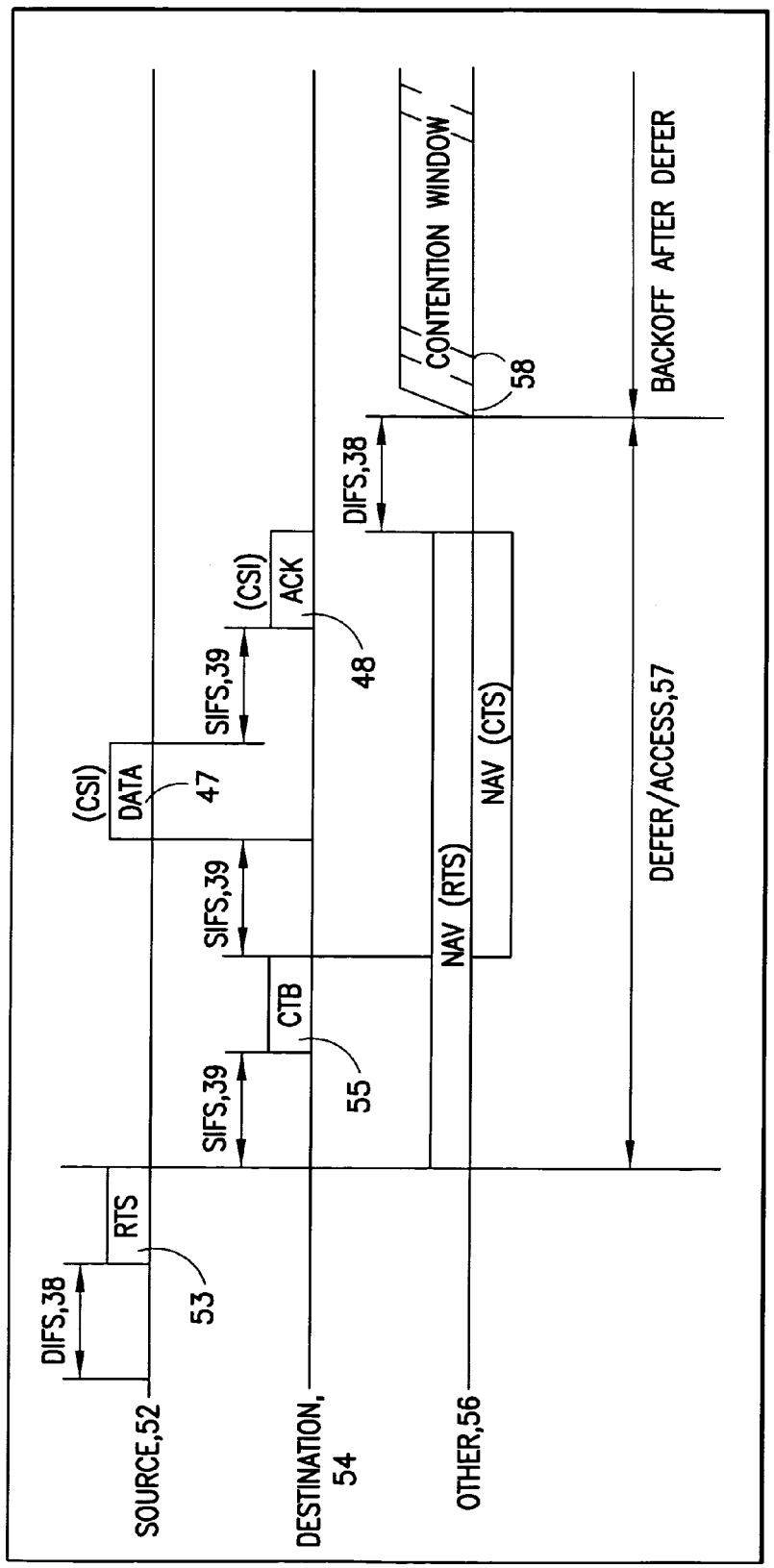
FIG. 3 is a timing diagram showing a RTS/CTS Frame Exchange during the contention period.

The above description pertains to the CFP 28 wherein the PC controls which station in an infrastructure network may next transmit. Following is a description as to how the present invention may be used within the contention period 29 following the CFP 28. Since the CFP 28 exists only while in the point coordination function 27, operation within the CP 29 is within the base DCF 26 layer of MAC 25 and is detailed at FIG. 3.

DCF lies directly on the PHY layer 21 and is based on Carrier Sense Multiple Access with Collision Avoidance (CSMA/CA) protocol, because wireless stations cannot listen for collisions while transmitting. As known in DCF, when a station has a frame with data to be transmitted, it first listens to ensure no other station is transmitting over the prescribed channel and transmits only if the channel is clear for a set period of idle time, termed a DCF-interframe space (DIFS) 38 that is longer than a PIFS. If the channel is busy, the station instead chooses a random "backoff factor" which determines a delay period 58 wait until it is allowed to transmit its data. During periods in which the channel is clear, the transmitting station decrements its backoff counter to shorten the delay period 58 so a delayed station gradually gains a higher priority to transmit. When the backoff counter reaches zero and the channel is clear for the duration of a DIFS 38, the station may transmit its frame with data. Since the probability that two stations will choose the same backoff factor is small, collisions between data frames from different stations are minimized.

When a particular station's backoff counter reaches zero and it senses the channel is clear for an entire DIFS 38, that station, termed the source 52 or transmitting station, first sends out a short ready-to-send (RTS) frame 53 containing information on the length of the frame with data to be transmitted. If the intended destination 54 to which the RTS 53 is directed hears it, the receiving station 54 responds with a short clear-to-send (CTS) frame 55. Only after this exchange does the source 52 send its data frame 47 during the CP 29. When the destination 54 receives the transmitted data frame 47 successfully (as determined in 802.11 by a cyclic redundancy check CRC), the receiving station (or PC) transmits an acknowledgment (ACK) frame 48. This back-and-forth exchange is necessary to avoid the "hidden node" problem previously explained. If the receiving station 54 has a data frame 47 to send, it must contend for a transmit slot as above and cannot piggyback data onto its ACK frame 48. During this process, other stations 56 defer transmission access 57 until they sense the channel is clear for a DIFS plus their backoff factor.

The present invention exploits the RTS/CTS interchange to provide valid CSI to at least the source 54 for use in transmitting the data frame 47. The benefits of the destination 54 using CSI obtained from the RTS/CTS exchange for use in transmitting the ACK only frame 48 are relatively minor as that frame is small. Since each station is at differing times both a source 52 and a destination 54, the means to implement the present invention are already in place and can be used for the ACK only frame 48, even if its practical effect is merely to send an unparsed ACK frame 48 over the most robust of the available sub-channels.

There is another opportunity within the 802.11 standard by which a station may obtain valid CSI for the channel over which it intends to transmit. A listening station, such as the other station 56 of FIG. 3 that is not a source 52 or destination 54 of a particular exchange, may transmit a CTS message to itself in accordance with the standard to obtain CSI. That CSI may then be used, within the coherence interval in which it is valid, to reserve the channel and preserve a clear channel access CCA mechanism.

Figure 4:
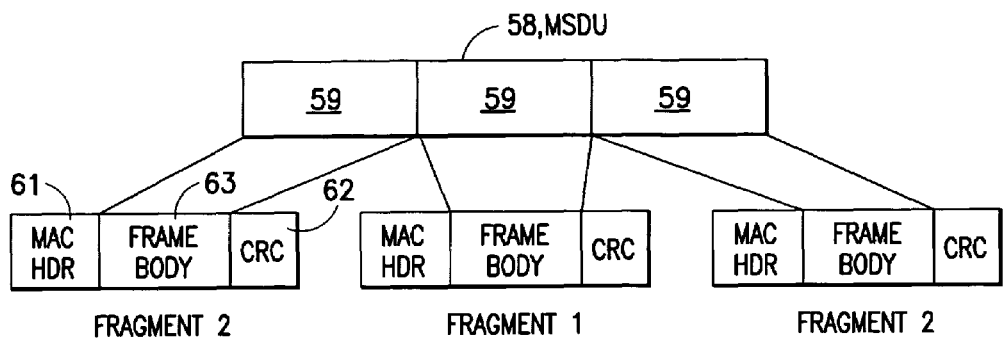
FIG. 4 is a prior art block diagram showing a fragmentation in IEEE 802.11 MAC.

FIG. 4 is a prior art block diagram of a MAC Service Data Unit (MSDU) 58, the term used to represent units of transmission in the MAC layer 25 of the 802.11 standard. As noted above, different messages maybe "piggybacked", and the different fragments 59 of the MDSU 58 represent those different messages, which may each be independently addressed. Each fragment includes a leading MAC header 61, a trailer 62 that includes a cyclic redundancy check CRC, and a frame body 53 between them. A single MDSU 58 may include more than one frames or fragments 59 (as in data+ACK frame, ACK+poll frame, etc.), or only one frame or fragment 59 (as in the poll only frame, data only frame, etc.)

Figure 5:
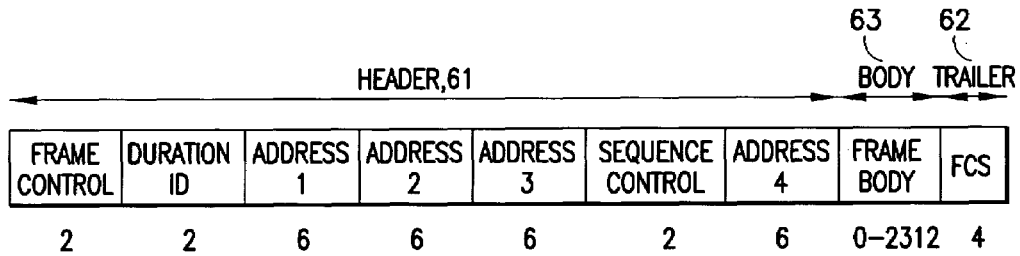
FIG. 5 is a prior art block diagram showing a IEEE 802.11 data frame format.
Figure 6:
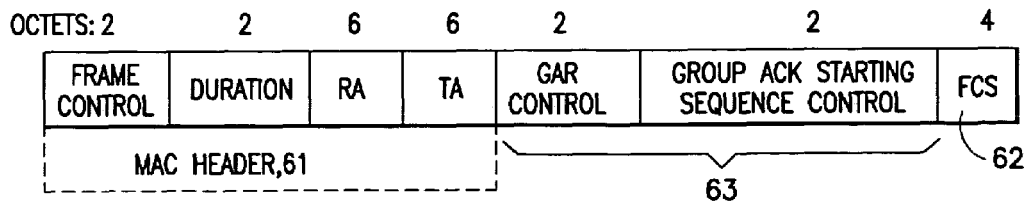
FIG. 6 is a prior art block diagram showing an ACK frame.
Figure 7:
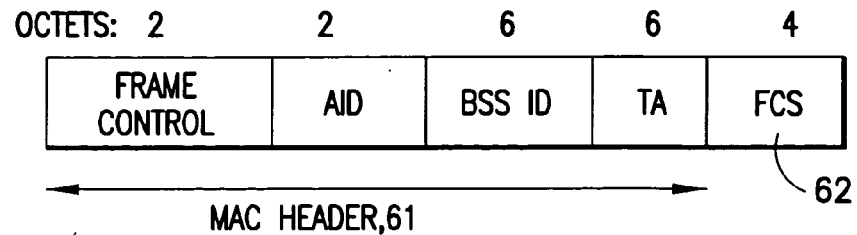
FIG. 7 is a prior art block diagram showing a PS-Poll Control Frame.
Figure 8:
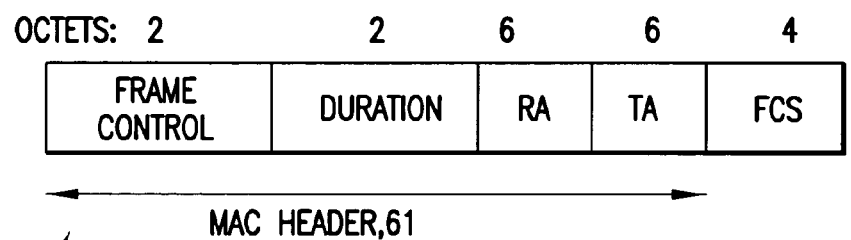
FIG. 8 is a prior art block diagram showing a RTS Control Frame.
Figure 9:
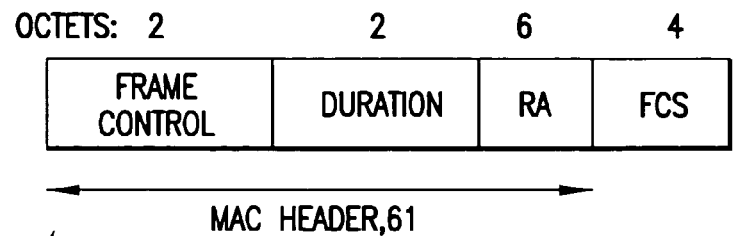
FIG. 9 is a prior art block diagram showing a CTS and ACK Control Frame.
Figure 10:
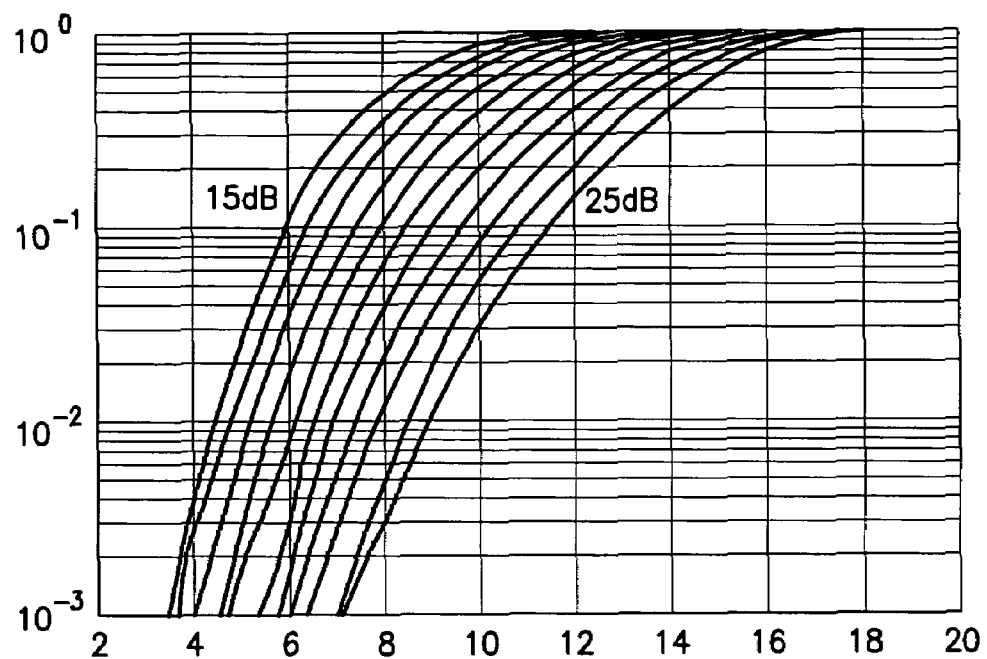
FIG. 10 is a graph of 2×2 Capacity curves in Rayleigh channels.

FIG. 5 shows a more detailed view of a data only frame 47 that may be one of the fragments 59 of an MDSU 58. The number of octets dedicated to each portion of the frame 47 is listed directly below the block. Each of FIGS. 5–9 are known in the art and consistent with the 802.11 standard, and are presented hereto demonstrate quantitative gains in using the present invention as compared to the current 02.11 standard. In the data only frame 47 of FIG. 5, the various portions of the header 61 use thirty octets, the trailer 62 uses four octets, and the body 63 carrying the substantive data may extend to 2312 octets, depending upon the amount of data to be sent. By comparison, FIG. 6 represents an ACK only frame 48 with a sixteen octet header 61, a four octet trailer 62, and a four octet body 63. FIG. 7 represents a poll only frame 48 with a sixteen octet header 61, a four octet trailer 62, and a zero octet body 63. FIG. 8 represents a RTS Control Frame 53 having the same relative sizes as those of the poll only frame 48 of FIG. 7 but with different header fields. FIG. 9 represents a CTS Control Frame 55 having a ten octet header 61, a four octet trailer 62, and a zero octet body 63. Using these relative frame sizes, one can calculate the data throughputs for various scenarios to compare a wireless network using the topology of the present invention to the topology currently stipulated in the 802.11 standard. Those calculations as concerning the present invention are presented below.

The minimum criteria for optimum transmission topology for wireless time division duplex TDD networks are:

1) valid CSI is present at the transmitter,
2) eigen-mode transmission is performed, and
3) the frame/packet is received by the intended recipient within a period less than the coherent time of the channel.

To achieve the capacities possible with the present invention, the transmitter should employ some weighting mechanism to assign frames, packets, fragments, or whatever division of the entire package to be transmitted to various sub-channels based on the measured quality of those sub-channels. Eigen-mode or waterfilling is one technique known in the art to do so, described mathematically below. For ad hoc networks and infrastructure networks during the contention period, the RTS/CTS exchange may be used. During the contention free period, the revised frame exchange described above may be employed to achieve valid CSI. In either case, the coherent weighting is done at the PHY layer 21, so the present invention modifies both the MAC and PHY layers.

TABLE 1

Half Duplex Frame Efficiency for 1500 byte packets using Optimum Topology Configurations @ MAC SAP

|  | 6 Mbps | 12 Mbps | 24 Mbps | 54 Mbps | 100 Mbps | 200 Mbps |
|---|---|---|---|---|---|---|
| CFP-Poll | 95.35% | 93.05% | 88.75% | 79.6% | 68.7% | 52.93% |
| CP-RTS/CTS | 93.8% | 90.9% | 85.6% | 74.74% | 62.55% | 46.2% |

Frame Efficiency as used in Table 1 is the time required to transmit the information portion of packet divided by the total on air time for packet. Thus, the overall capacity is found by multiplying the frame efficiency by the capacity/throughput, which are shown in Table 2 below:

TABLE 2

802.11 Capacity Requirements in bps using Optimum Topology Configurations @ MAC SAP

|  | 6 Mbps | 12 Mbps | 24 Mbps | 54 Mbps | 100 Mbps | 200 Mbps |
|---|---|---|---|---|---|---|
| CFP-Poll | 0.52 | 1.07 | 2.25 | 5.65 | 12.13 | 31.5 |
| CP-RTS/CTS | 0.533 | 1.10 | 2.34 | 6.02 | 13.32 | 36.1 |

The capacity requirements are computed as raw data rate/12 Msymbols/sec/Frame efficiency to yield the target throughput/capacity at the MAC SAP layer. The theoretical best performance for these capacity requirements can be read from FIG. 10 for a 2×2 configuration (2 input antennas, 2 output antennas) in Rayleigh fading, or computed using the formula below for any arbitrary MIMO configurations $$C = \log_2\left[\det\left(I_M + \frac{\gamma}{N}HH^t\right)\right] \text{ bps/Hz}$$

Eigen-mode transmission as noted above is described as follows. Let the singular value decomposition of H be H=UεV, where U and V are unitary matrices and ε be a diagonal matrix with positive real values on the diagonal elements representing the singular values of the channel. If the transmitted vector r is pre-multiplied by V in the transmitter and received vector is post multiplied by $U^H$ in the receiver, i.e., $VrU^H=V(Hx+n)U^H=\epsilon x+m$, where $m=Vn*U^H$ and there is no noise amplification and remains spatially white.

Figure 11:
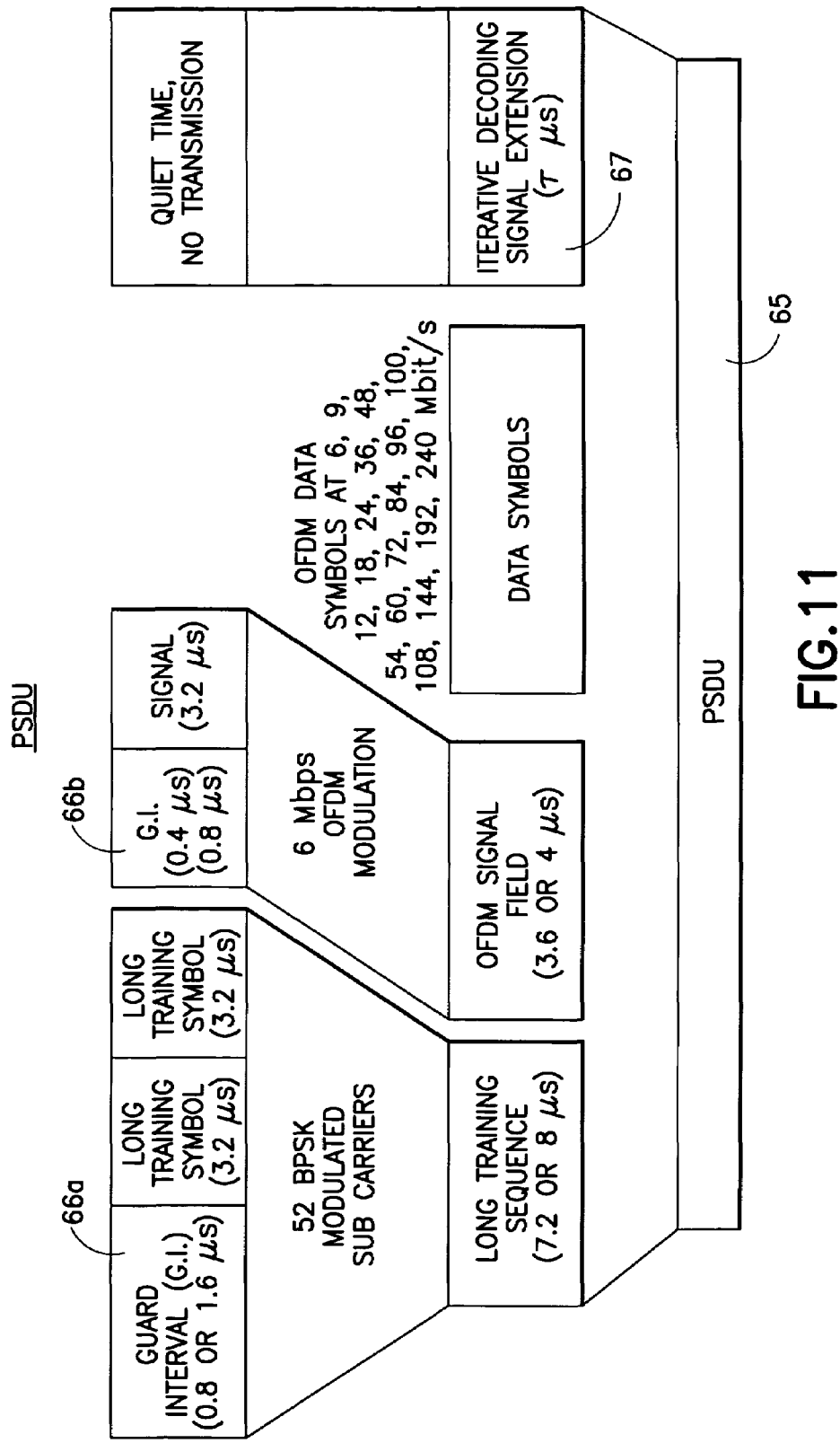
FIG. 11 is a PDSU for Optimum Topology according to the present invention

Because a single MAC layer must interface with disparate PHY layers, the 802.11 standard uses an additional protocol layer termed the Physical Layer Convergence Protocol (PLCP) disposed between them that is defined differently for each transmission method. The PLCP adds a preamble and a header (each of various sizes) to a PLCP Service Data Unit (PSDU), which is the portion of the complete transmission frame (PPDU or PLCP Protocol Data Unit at the PHY layer) that carries the actual data to be transmitted between stations or between the point controller PC and a station. FIG. 11 is a block diagram showing a PSDU 65 for optimum topology according to the present invention, with times and numbers of bits tailored for compatibility with the 802.11 standard as it currently is written. The present invention enables the length of a guard interval 66a, 66b to be selectable (to vary) based on the CSI. For certain channels, the delay spread of the channel is shorter than other time and hence not necessary to keep a fixed cyclic prefix (CP) overhead. Further, if capacity achieving codings are used, such as low density parity check codes (LDPC) or Turbo codes, then additional time is allocated at the end of the packet for iterative decoding, which is not currently available in current IEEE 802.11 standard or its amendments. This additional time is represented in the PSDU 65 of FIG. 11 as an iterative decoding signal extension 67.

While there has been illustrated and described what is at present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method of communicating over multiple sub-channels of a wireless local area network comprising:
   sending a control message that is not combined with a data message from a first network entity to a second network entity, said control message to facilitate sequencing of wireless transmissions among at least two entities in a wireless network;
   receiving the control message at the second network entity and obtaining channel state information CSI from the received control message;
   using the CSI to determine that a capacity of a first sub-channel of the wireless network is greater than a capacity of a second sub-channel of the wireless network;
   dividing a data message to be sent into at least a first data message segment defining a first data segment size and a second data message segment defining a smaller second data segment size, said first and second data segment sizes based on the relative capacities of the first and second sub-channels; and
   in response to receiving the control message, sending from the second network entity the first data message segment over the first sub-channel, and the second data message segment over the second sub-channel.

2. The method of claim 1 wherein said CSI is valid until at least the data message is sent in its entirety.

3. The method of claim 1 wherein the control message is a clear-to-send CTS message, the method further comprising, prior to sending the CTS message, the second network entity sending a request-to-send RTS message.

4. The method of claim 1 further comprising the first network entity receiving the entire data message and replying to the second network entity with an acknowledgement ACK message.

5. The method of claim 4 as executed within a contention period CP of a wireless networking architecture.

6. The method of claim 4 executed during a contention free period CFP, wherein the first network entity is a point coordinator PC of a wireless network basic service set BSS, the control message is a poll of the second network entity, the method further comprising the PC sending an acknowledgement ACK message combined with a separate data message.

7. The method of claim 6 further comprising, during the same CFP, the PC sending a poll of a third network entity, the PC failing to receive a response from the third network entity within a first time period, and the PC sending a poll of a fourth network entity within a second time period that is greater than the first time period.

8. The method of claim 4 wherein the PC responds to a data message received from a network entity with an ACK message combined with a separate control message that signals an end of a contention free period.

9. The method of claim 1 executed during a contention free period CFP, wherein the first network entity is a point coordinator PC and the control message is a first poll of the second network entity, wherein prior to sending a control message that is not combined with a data message from the PC to the second network entity, the method further comprises:
  sending from the PC an initial poll that is not combined with a data message to an initial network entity;
  upon the PC failing to receive a response to the initial poll from the initial network entity within a first time period, the PC sending, within a second time period that is greater than the first time period, one of:
    a data message to the initial network entity and
    the first poll of the second network entity.

10. The method of claim 9 wherein the first time period is less than twice the second time period.

11. The method of claim 1 executed during a contention free period CFP of a wireless networking architecture, wherein sending the data message segments comprises sending them from the second network entity to a third network entity that is not a point controller PC of the network, the method further comprising:
  in response to receiving the data message segments, the third network entity sending to the second network entity an ACK message within a first time period, and within less than twice the first time period following the ACK message from the third entity, the first station sending one of:
    a poll to a network entity; and
    a data message to the second network entity that is divided into third and fourth data message segments defining third and fourth segment sizes respectively, said third and fourth segment sizes based on relative capacities of sub-channels as determined by CSI that is measured from at least one data message segment sent from the second network entity to the third network entity.

12. The method of claim 1 wherein at least one of the first network entity and the second network entity is a mobile station.

13. In a method of communicating data over a wireless local area network according to a wireless LAN standard, the improvement comprising:
  while in a contention free period CFP, separating by at least one Short InterFrame Space SIFS a poll and a data message sent by a point controller PC; and
  while in a contention period CP,
    measuring channel state information CSI during a Request-to-Send/Clear-to-Send RTS/CTS exchange;
    parsing a data message from a station sending the RTS to a station sending the CTS into at least a first data message segment defining a first size and a second data message segment defining a smaller second size, said first and second sizes based on relative capacities of a first and second sub-channel as determined by the measured CSI, and
    sending the first data message segment over the first sub-channel and the second data message segment over the second sub-channel, wherein the capacity of the first sub-channel is determined to be greater than the capacity of the second sub-channel.

14. In a method of communicating data over a wireless local area network according to a wireless LAN standard, the improvement comprising:
  while in a contention free period CFP, separating by at least one Short InterFrame Space SIFS a poll and a data message sent by a point controller PC; and
  while in the CFP, the PC being restricted to sending only one of:
    a poll;
    a data message parsed into data segments having sizes based on relative sub-channel capacities as determined by measured CSI and transmitted among at least two sub-channels;
    a data message so parsed and transmitted that is combined with an ACK message;
    a CFP-End message; and
    a CFP-End message that is combined with an ACK message.

15. In a method of communicating data over a wireless local area network according to a wireless LAN standard, the improvement comprising:
  while in a contention free period CFP, separating by at least one Short InterFrame Space SIFS a poll and a data message sent by a point controller PC; and
  prohibiting the PC from sending a data message without parsing the data message into segments whose relative sizes are based on relative sub-channel capacities as determined by one of valid measured CSI and estimated CSI.

16. In a method of communicating data over a wireless local area network according to a wireless LAN standard, the improvement comprising:
  while in a contention free period CFP, separating by at least one Short InterFrame Space SIFS a poll and a data message sent by a point controller PC; and
  wherein the PC sends a poll to a mobile station, the improvement comprising:
    the mobile station measuring channel state information from the poll;
    the mobile station determining relative capacities of at least a first and a second sub-channel based on the CSI;
    the mobile station parsing a data message to be sent into at least a first data message segment defining a first size and a second data message segment defining a smaller second size, said first and second sizes based on the determined relative capacities of the first and second sub-channels; and
    the mobile station transmitting the first data segment over the first sub-channel and the second data segment over the second sub-channel when the determined capacity of the first sub-channel exceeds the determined capacity of the second sub-channel.

17. A network entity for communicating over a wireless local area network (WLAN) comprising:
  a receiver for receiving over at least two sub-channels a control message from an entity of a wireless local area network WLAN;
  a processor for determining a capacity of a first sub-channel and a capacity of a second sub-channel based on channel state information CSI measured from the control message;
  means for parsing a data message into at least first and second segments based on the relative determined capacities of the first and second sub-channels;
  a first and second antenna having inputs coupled to an output of the means for parsing, said first antenna for transmitting over the WLAN at least the first segment over the first sub-channel and said second antenna for transmitting at least the second segment over the second sub-channel.

18. The network entity of claim 17 wherein the processor is further for enabling at least the first antenna to transmit a request for the control message over the first sub-channel when said receiver fails to detect a transmission from any other network entity for a period of time at least equal to a short interframe space plus a backoff period.

19. The network entity of claim 17 wherein the network entity is a mobile station.

* * * * *